US008947295B2

(12) United States Patent
Collins

(10) Patent No.: US 8,947,295 B2
(45) Date of Patent: Feb. 3, 2015

(54) LOW CLUTTER METHOD FOR BISTATIC RCS MEASUREMENTS

(75) Inventor: Peter J Collins, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 301 days.

(21) Appl. No.: 13/534,080

(22) Filed: Jun. 27, 2012

(65) Prior Publication Data

US 2014/0002297 A1    Jan. 2, 2014

(51) Int. Cl.
*G01S 7/41* (2006.01)
*G01S 7/02* (2006.01)
*G01S 7/00* (2006.01)

(52) U.S. Cl.
USPC ............... 342/165; 342/52; 342/53; 342/173; 342/175

(58) Field of Classification Search
USPC ..................... 342/1–11, 52–55, 59, 165–175; 343/700 R, 832, 834, 837, 878, 880, 343/882, 890, 891
See application file for complete search history.

(56) References Cited

U.S. PATENT DOCUMENTS

| | | | | |
|---|---|---|---|---|
| 3,487,462 A | * | 12/1969 | Holberg | 342/59 |
| 4,146,897 A | * | 3/1979 | Wilson et al. | 343/882 |
| 4,670,760 A | * | 6/1987 | Biby | 343/832 |
| 4,713,667 A | | 12/1987 | Poirier et al. | |
| 4,873,571 A | | 10/1989 | Balet et al. | |
| 4,990,923 A | * | 2/1991 | Delfeld | 342/165 |
| 5,075,681 A | * | 12/1991 | Kartiala | 342/165 |
| 5,202,701 A | * | 4/1993 | Casey | 343/837 |
| 5,721,553 A | * | 2/1998 | James | 342/165 |
| 5,910,787 A | * | 6/1999 | Berg et al. | 342/165 |
| 5,936,568 A | * | 8/1999 | Berg et al. | 342/1 |
| 6,008,753 A | * | 12/1999 | Berg et al. | 342/165 |
| 6,252,541 B1 | * | 6/2001 | James | 342/165 |
| 7,498,977 B2 | * | 3/2009 | Wei et al. | 342/165 |
| 8,098,194 B2 | * | 1/2012 | Wei et al. | 342/165 |

OTHER PUBLICATIONS

Qui, Cheng-Wei et al., "Spherical cloaking with homogeneous isotropic multilayered structures", Physical Review E 79.4 047602 (2009).
Hsieh, Chih-Yao et al., "An Outdoor Bistatic Scattering Assessment Using Array Antennas", PIERS Online, vol. 6, No. 4, pp. 355-359 (2010).
Sarabandi, Kamal, "A Novel Bistatic Scattering Matrix Measurement Technique Using a Monostatic Radar", IEEE Transactions on Antennas and Propagation, vol. 44, No. 1, pp. 41-50 (Jan. 1996).
Gürel, L. et al., "Validation through comparison: Measurement and calculation of the bistatic radar cross section of a stealth target", Radio Science, vol. 38, No. 3, 1046, doi:10.1029/2001RS002583 (2003).

(Continued)

*Primary Examiner* — Bernarr Gregory
(74) *Attorney, Agent, or Firm* — AFMCLO/JAZ; Charles Figer, Jr.

(57) ABSTRACT

A bistatic radar measurement system is provided having a radar source configured to produce a radio frequency signal. A transmitting antenna is configured to transmit the radio frequency signal toward a target. A receiving antenna is configured to receive a reflected radio frequency signal from the target. A support system is configured to support the receiving antenna. The support system includes a plurality of low scattering dielectric strings configured to orient the receiving antenna.

8 Claims, 6 Drawing Sheets

(56) References Cited

OTHER PUBLICATIONS

Gupta, Inder J. et al., "Scattering by Dielectric Straps with Potential Application as Target Support Structures", IEEE Transactions on Antennas and Propagation, vol. 37, No. 9, pp. 1164-1171 (Sep. 1989).

Kent, Brian M. et al., "Design and Installation of an inverted Stewart Platform Target Suspension System using Lightweight, High Tensile Strings for Scattering Measurements", IEEE Antennas and Propagation Society International Symposium, pp. 589-592, (Jun. 2007).

* cited by examiner

LOW CLUTTER METHOD FOR BISTATIC RCS MEASUREMENTS

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention generally relates to the field of bistatic radar cross-section (RCS) measurement apparatus and, more particularly, to a bistatic RCS measurement system capable of reducing contaminating bistatic clutter.

2. Description of the Related Art

Bistatic radars and consequently bistatic RCS measurements have existed from the advent of radar nearly 80 years ago. In a typical measurement, a transmit antenna is used to direct a beam of electromagnetic radiation at a target supported by a low-scattering structure and then a receive antenna measures the scattered radiation to determine the RCS. The antennas are generally mounted on towers to elevate them above the ground and thereby minimize the clutter introduced by the ground. It is noted the radiation reflected off the ground is sometimes used to provide a signal strength enhancement on large ranges, but care is taken to create a flat, clutter-free reflecting surface. In either case the bistatic receive antenna is placed at a different location than the transmit antenna to sample the radiation scattered from the target at a bistatic angle measured in the plane defined by the transmit antenna, target, and receive antenna.

Bistatic RCS measurements may be split into two categories. Either the bistatic antenna is held at a fixed location with respect to the transmit antenna and target while the target is rotated or the target is held at a fixed pose while the bistatic antenna is rotated around the target. The former is known as a "fixed-angle bistatic measurement" and the later as a "variable-angle bistatic measurement." In both situations the mechanism supporting the bistatic antenna and receiver can provide a significant source of clutter that is difficult to remove with RF gating because of the range geometry and signal path timing. Therefore, the antenna support structures are usually covered with radar absorbing material (RAM) to minimize the resulting clutter. For many targets, the attenuation provided by the RAM material is insufficient to reduce the structural scattering to levels that do not significantly contaminate the desired signal. Also, the complex measurement range geometries encountered in bistatic measurements make shaping the support structures so as to redirect the reflected radiation away from the receive antenna structure for all angles virtually impossible.

Accordingly, there is a need in the art for an improved bistatic measurement apparatus.

SUMMARY OF THE INVENTION

Embodiments of the invention provide a bistatic radar measurement system having a radar source configured to produce a radio frequency signal. A transmitting antenna is configured to transmit the radio frequency signal toward a target. A receiving antenna is configured to receive a reflected radio frequency signal from the target. A support system is also provided for supporting the receiving antenna. The support system includes a plurality of low scattering dielectric strings configured to orient the receiving antenna.

Some embodiments of the bistatic radar measurement system include an RF optical modem in electrical communication with the receiving antenna. The RF optical modem may be configured to amplify and convert the received reflected radio frequency signal to an optical signal. In these embodiments, a low radar cross section scattering fiber optic cable is used in communication with the RF optical modem and the radar source. The optical signal is transmitted from the RF optical modem to the radar source through the fiber optic cable.

The support system in some embodiments includes a rail and a plurality of carts each configured to move along the rail. A plurality of string motors are coupled with each of the plurality of carts. The string motors may be configured to adjust the plurality of dielectric strings. In some of these embodiments of the bistatic radar measurement system, the plurality of carts is configured to move in tandem along the rail. Additionally in some of these embodiments, the string motors adjust the translational movement of the dielectric strings in concert with the movement of the carts along the rail. Some embodiments additionally include a feedback control system and at least one infrared camera array in electrical communication with the feedback control system. The feedback control system may be configured to orient the receive antenna via the carts and string motors.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention provide a new mitigation strategy aimed at overcoming the problems in the art by reducing clutter associated with a bistatic antenna support structure. The embodiments leverage the fact that the stability of an inverted Stewart platform far exceeds contemporary three and four string designs, providing a stable, low interaction support system for RCS measurements. These same properties assist in reducing clutter introduced by the antenna support structure in a bistatic measurement.

Figure 1:
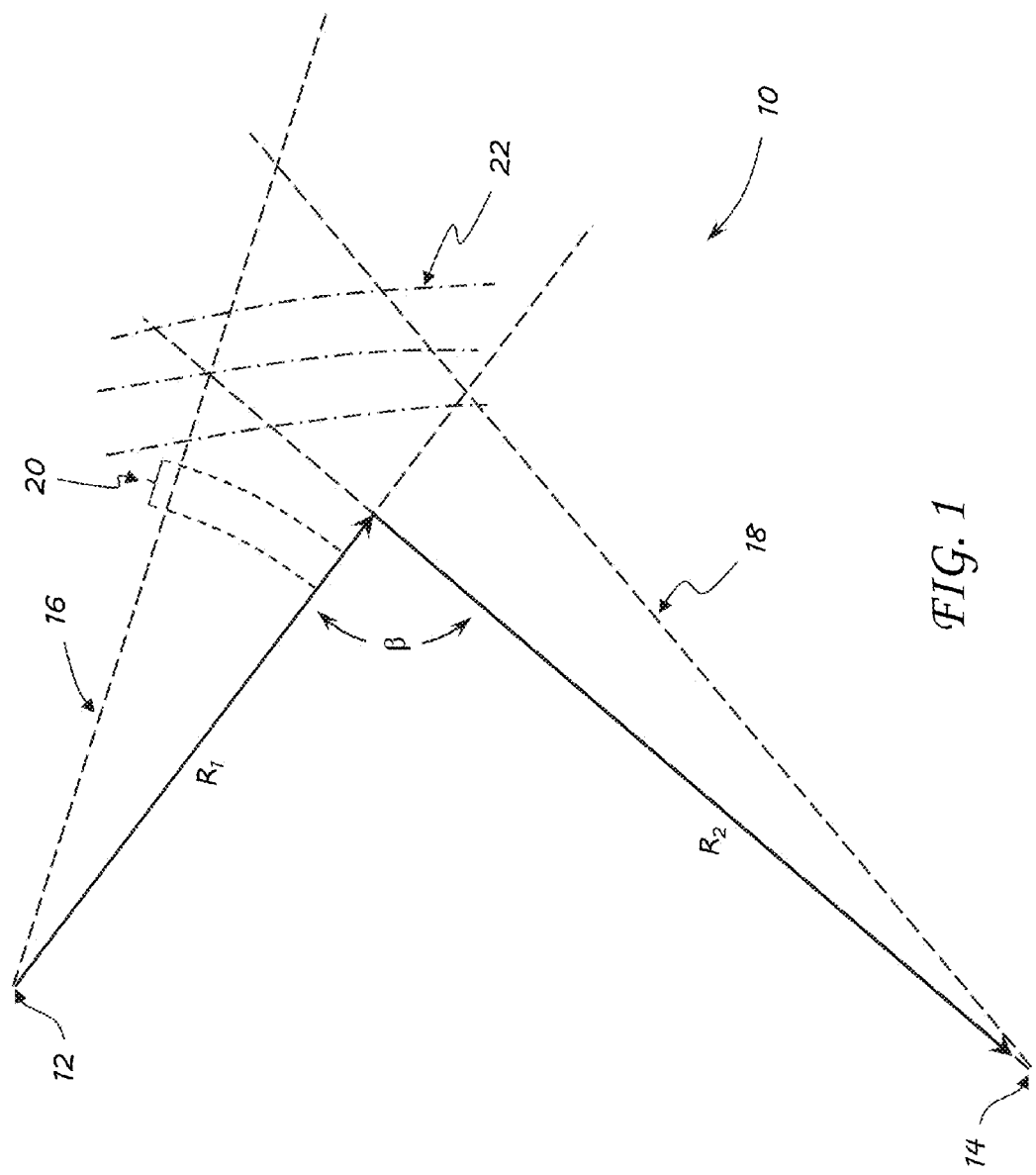
FIG. 1 is a diagrammatic representation of bistatic measurement geometry with a bistatic angle $\beta$.

Bistatic RCS is defined by the IEEE Standard 686-2008 as one of the cases of the more general radar cross section (RCS) definition whereby energy is "reflected or scattered in any direction other than the incident direction or opposite of the incident direction." According to this standard, RCS is a measure of the reflective strength of a radar target; usually represented by the symbol a and measured in square meters. The reflective strength is not only a function of physical size, but of shape, frequency, polarization, aspect angle, and target material properties FIG. 1 depicts a typical bistatic measurement configuration 10. This configuration contains a transmitter 12 and at least one receiver 14. Transmitter beam 16 intersects the receiver beam 18 at an arbitrary angle β. Note that in some embodiments, the transmitter 12 may transmit pulsed beams having a pulse width 20. Notice for any target position there are associated lines of constant phase delay 22 where scattering from the measurement environment can be introduced through antenna side lobes or target bistatic illumination to provide a contamination source. Equation (1) gives the received power for the case of distributed clutter characterized by an RCS per unit area $\sigma^c$ as, $$P_r = \frac{P_t \lambda^2}{(4\pi)^3} \int_A \frac{G_t G_r \sigma^c}{R_1^2 R_2^2} dA \quad (1)$$

where $P_r$ is the received clutter power, $P_t$ is the transmitted power, $G_t$ and $G_r$ are the transmit and receive antenna gains, $\lambda$ is the wavelength, and $R_1$ and $R_2$ are the ranges from the transmitter and receiver to the target. If there is a relatively large clutter source, such as an antenna support structure, in the clutter ellipse containing the desired target, Equation (1) indicates that it will be integrated into the clutter power competing with the desired target return.

Figure 2:
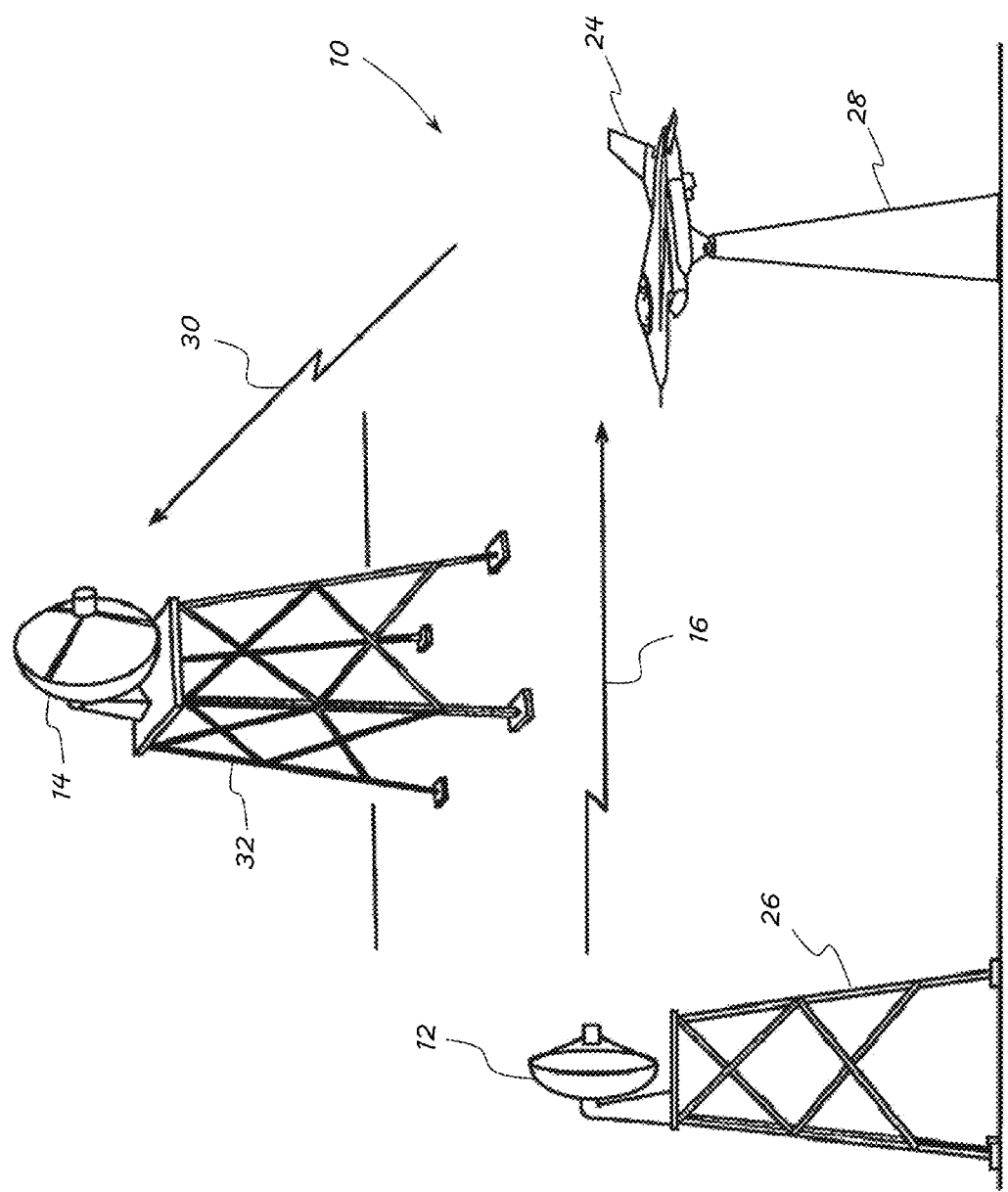
FIG. 2 is a representation of a typical contemporary bistatic RCS measurement system.

Turning now to FIG. 2, the basic components of the typical bistatic RCS measurement configuration 10 are illustrated. A radar emits a pulsed radar beam 16 director toward a target 24 by the transmit antenna 12 mounted on an antenna support tower 26. The radiation is scattered by the target 24 mounted on a target support 28 in all directions, including toward 30 a receive antenna 14 mounted on a similar tower 32. There may be several receive antennas at different locations if a multistatic measurement is desired. In either case, the receive signal is range gated by the radar for a selected period of time to sample the radiation scattered by the target 24 in the receiver direction 30 and reject the radiation scattered by the reflection from the ground.

The difficulty encountered in this gating process is that the transmit antenna 12 also illuminates the rest of the measurement environment though its side lobes. The target 24 itself also scatters radiation into the environment in all directions producing a secondary source of clutter illumination. In particular, the towers 26, 32 supporting the antennas themselves represent a significant source of clutter that in the case of a variable angle bistatic measurement generates a moving clutter source. This clutter source often falls within the range gate of the target measurement.

Common clutter suppression techniques such as range gating and coherent background subtraction may be ineffective if the target has strong bistatic scattering lobes which interact with these background structures. Since the exact interaction geometry is target dependent and, in the case of a variable bistatic angle measurement, angle dependent, it is difficult to design an absorber treatment that is equally effective for all measurement geometries. One alternative is to create a non-interacting support mechanism for the bistatic receiving channel.

Embodiments of the invention replace the ridged antenna support structure (26, 32 in FIG. 2) commonly used in bistatic measurement ranges with a low scatter string support system. The scattering characteristics of high tensile strength dielectric strings have been shown sufficient for low RCS measurements while being able to support significant target loads. However, the inherent instability of contemporary suspension type support systems limits their use as compared to ogival pylons and foam columns.

One of the challenges in moving from target support to supporting an active bistatic antenna receiver is the need to get the received signal back to the radar without re-introducing scattering structures such as RF cables into the range. Embodiments of the invention utilize a wide-band RF-to-optical modem to convert the received RF signal to an optical signal which can be sent to the receiver via a relatively small, low scattering fiber optic cable. Thus the only significant scattering structure in the range is the actual receive antenna 14 and a small box housing the LNA, modem, and battery power supply (see FIG. 3).

Figure 3:
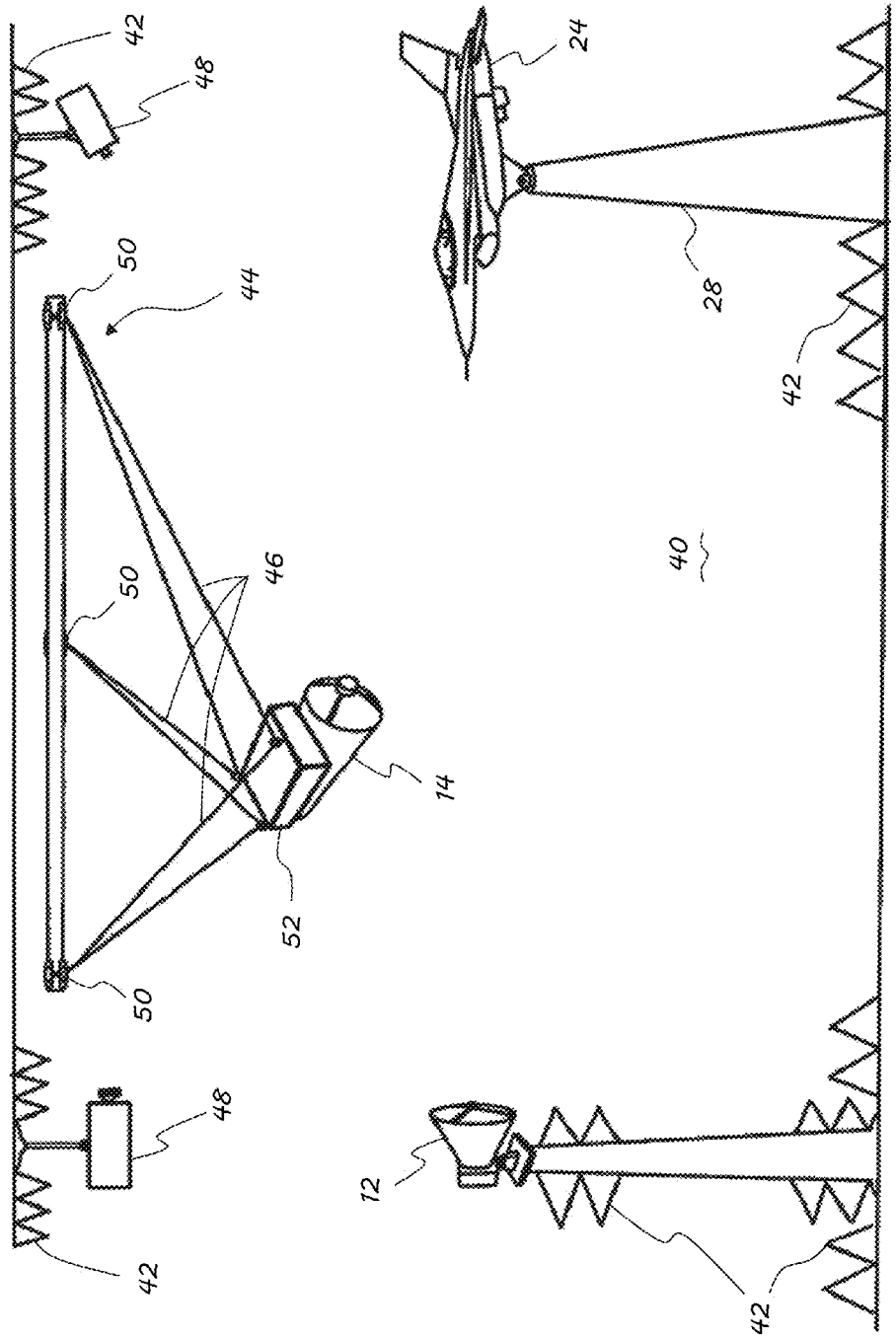
FIG. 3 illustrates one embodiment of the invention utilizing an inverted Steward Platform configuration.
Figure 4:
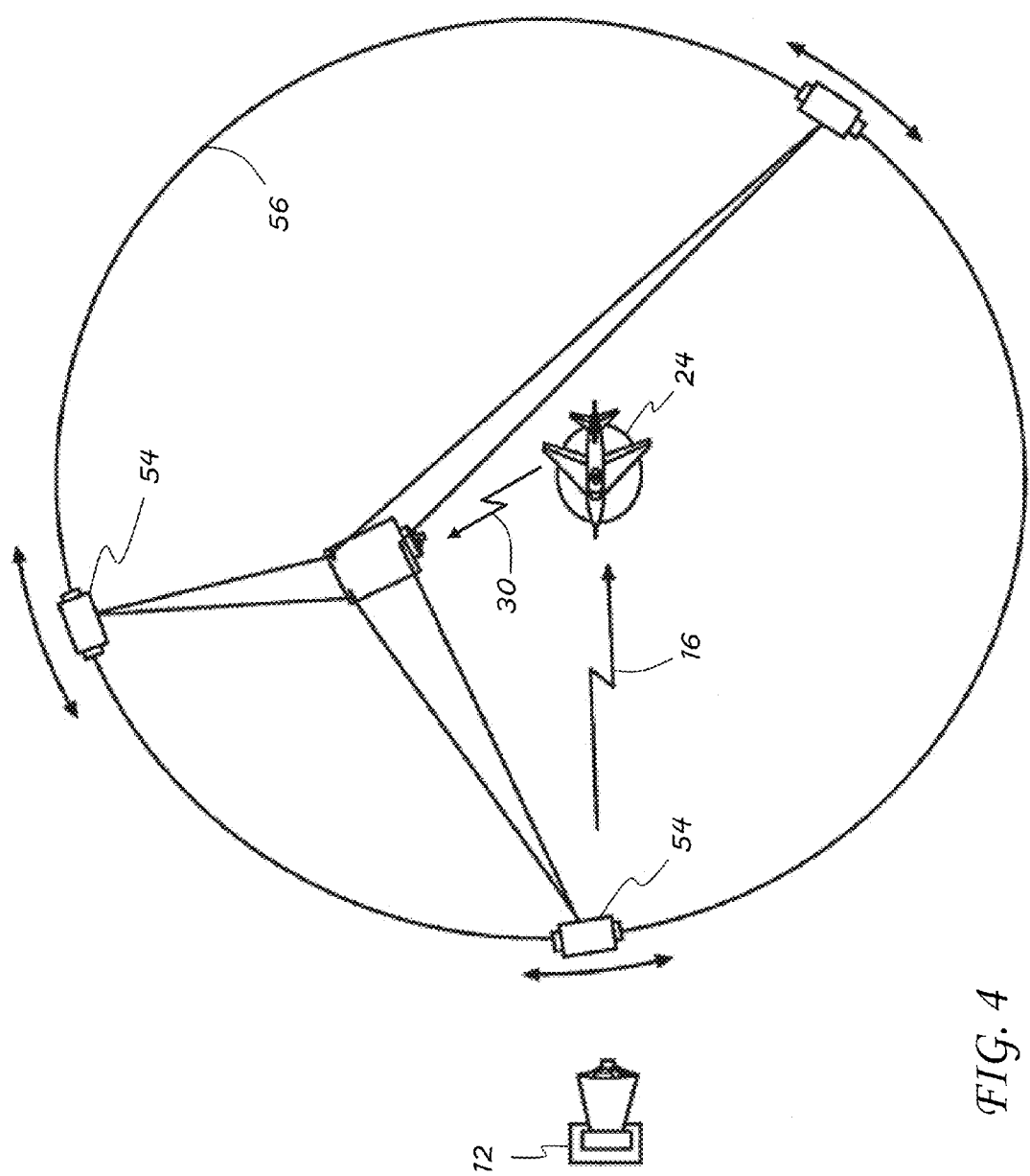
FIG. 4 is a top view of the embodiment of FIG. 3.

FIGS. 3 and 4 illustrate a bistatic measurement range 40 in an indoor anechoic chamber configuration having the same radar, transmit antenna 12, target 24, target support 28, and receive antenna 14 as the contemporary system of FIG. 2. The walls of the chamber are lined with absorber 42 and located a distance sufficient to be gated out of the received measurement. Unlike the contemporary system of FIG. 2, embodiments of the receive antenna 14 may be supported by a multi string positioning system 44 utilizing a Stewart Platform design for stability. In the illustrated embodiment in FIGS. 3 and 4, six strings 46 are used, though other embodiments may use other numbers of strings. The support system utilizes an infrared camera array 48 in a feedback control system to precisely orient the receive antenna throughout the measurements. Each individual string 46 is a low scattering dielectric controlled by a separate motor cart 50 in the ceiling. A received radio frequency signal may be amplified and converted to an optical signal by a RF optical modem 52. This optical signal may then be sent to the radar via a low RCS scattering fiber optic cable where it is converted back to an RF signal processed by the radar. This means of sending the bistatic scattered signal to the radar's receive channel assists in minimizing the clutter produced by the traditional RF cable in the range. FIG. 4 presents a top view of the illustrated embodiment in FIG. 3 showing how the string motors 50 mounted on carts 54 move in tandem around a ring 56 in the ceiling operating in concert with the translational movement of the strings to position the receive antenna 14 around the target 24 in a measurement arc. The combined effect of these components and methods assists in producing a low scatter means to sample the bistatic RCS produced by the target 24.

In order to demonstrate the viability of the embodiments of the invention, a comparative experiment was conducted where the same target was measured in a RCS measurement range using the traditional bistatic arm and an embodiment of the invention. The experiment was designed specifically to keep all variables the same except the clutter introduced by the bistatic receiver support system.

The facility measurement range used for the experiment was an anechoic chamber with a tapered design approximately 14'×16' at the throat, 24'×26' at the back wall, and 45' in length. The facility was designed primarily for academic research and thus is fairly flexible, being able to be configured as a far-field or compact range with either ogive pylon, foam column, or string target support systems. When configured for bistatic measurements, the bistatic arm/string support system may be used in conjunction with the latter target support mechanisms to provide either swept or fixed angle bistatic measurements. The range uses a Lintek 4000, PNA based pulsed CW radar with a frequency coverage from 2-18 GHz. For this particular experiment, Flamm & Russell FR6400 low side lobe diagonal horns were used in the transmit channel to minimize clutter illumination. The penalty was the reduction in frequency range to 6-18 GHz due to antenna cutoff.

A target was chosen with a fairly wide dynamic range and relatively large bistatic signature. A 6" square metal plate served the purpose for the size and frequency range available. Horizontal ($\phi\phi$) polarization was used for the resulting low RCS near the edge-on illumination angles.

For both the contemporary bistatic arm measurement and the string support measurement consistent with embodiments of the invention, the standard RCS calibration procedure as expressed in Equation (2) was performed. Specifically the calibrated bistatic RCS is defined by, $$\sigma = \frac{\sigma_{tar} - \sigma_{bkg}}{\sigma_{cal} - \sigma_{cbk}} \cdot \sigma_{thr} \quad (2)$$

where the tar subscript denotes the target measurement, bkg denotes target background, cal denotes calibration object, cbk denotes calibration background, and thr denotes the theoretical calibration object bistatic RCS. The calibration was verified resulting in measurement uncertainties of ±0.75 dBsm.

For the two measurements, the bistatic receiver was positioned approximately 20° from the transmitter and approximately 8' from the target. The target was mounted on a low RCS ogival pylon and rotated 360° about an axis in the plane of the plate and perpendicular to the plane formed by the transmit and receive legs.

Figure 5:
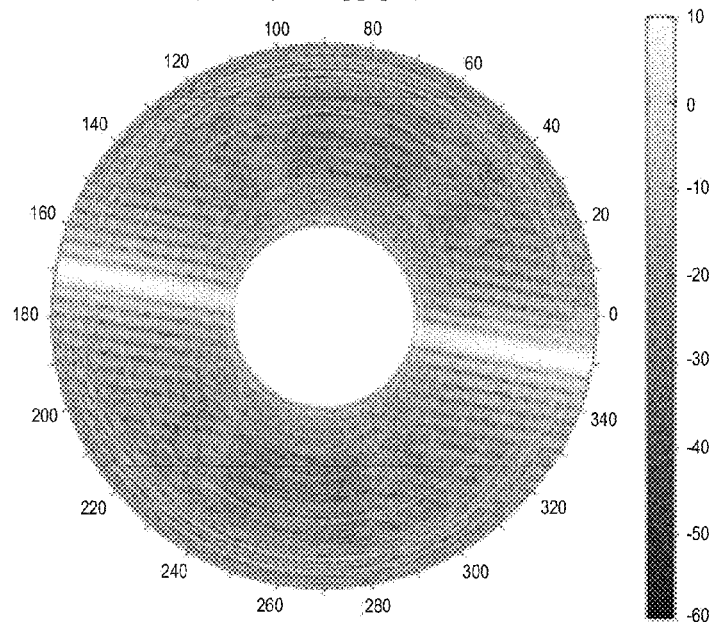
FIG. 5 is a contoured plot of global RCS for a test plate with a fixed bistatic angle using a contemporary measurement system.
Figure 6:
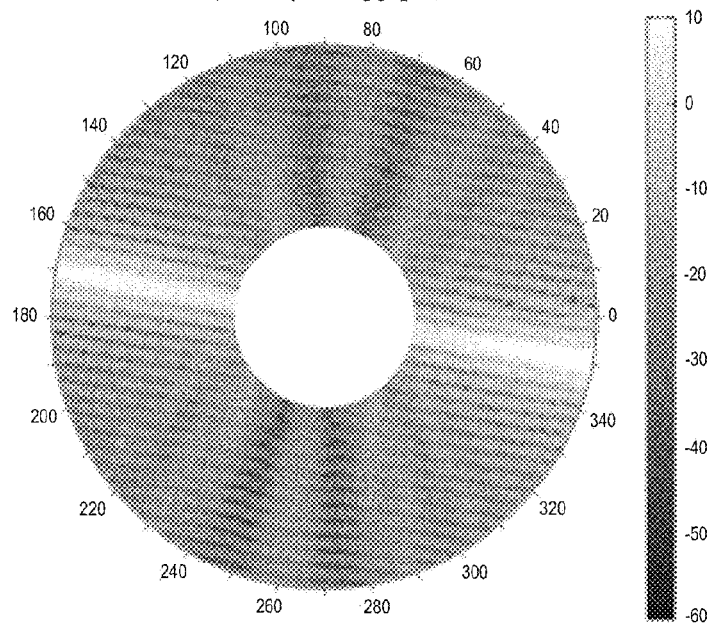
FIG. 6 is a contoured plot of global RCS for the test plate of FIG. 5 with a fixed bistatic angle using an embodiment of the invention.

Referring now to the global RCS plots shown in FIGS. 5 and 6, the global RCS represents a frequency dependent bistatic scattering as a function of the plate's angle with respect to the illumination direction. The inner radius corresponds to a frequency of 6 GHz and the outer 18 GHz. From both figures a peak RCS response can be seen at 170° and 350°. This is consistent with the 20° fixed bistatic angle and relative position of the receive antenna as the plate rotated. Also note that the peak values are of equal magnitude in dBsm, indicating a relatively high signal to clutter level.

With respect to the lower RCS sectors of the plots, a distinct difference can be seen in the scattering behavior. While the plate measured with the embodiment of the invention utilizing the string support system shows the distinctive lobing structure associated with near grazing incidence angles, the contemporary bistatic arm exhibits less lobing and a higher overall RCS level indicative of an interfering source. Also, there are a few discrete frequencies with what appears to be radio frequency interference (RFI) in the bistatic arm measurement of FIG. 5. It can been seen from the plots in FIGS. 5 and 6 that there is a higher clutter level in the bistatic arm measurements. To better recognize the source of this clutter, the associated global range plots generated by concatenating a series of down range images at each measurement angle are presented in FIGS. 7 and 8.

Figure 7:
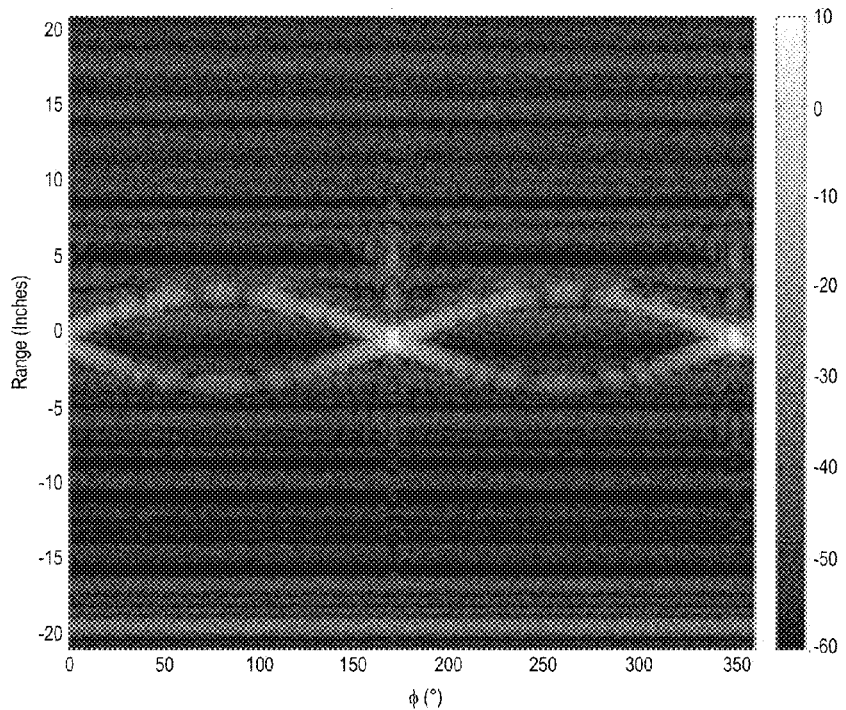
FIG. 7 is a contoured plot of global range for the test plate of FIG. 5 with a fixed bistatic angle using the contemporary measurement system of FIG. 5.
Figure 8:
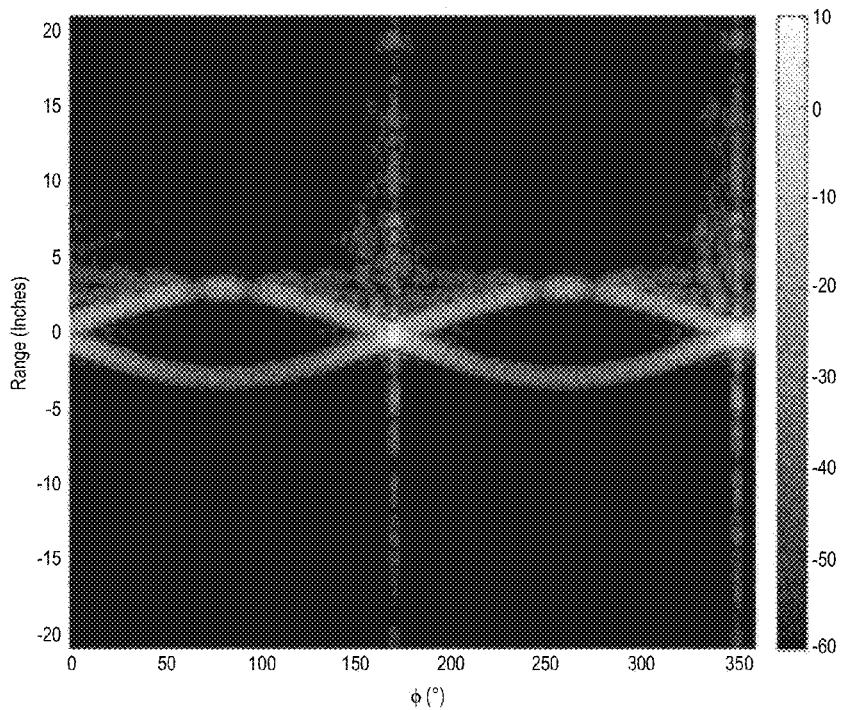
FIG. 8 is a contoured plot of global range for the test plate of FIG. 5 with a fixed bistatic angle using the embodiment of FIG. 6.

FIGS. 7 and 8 also indicate that the bistatic arm measurements contain a significantly higher clutter level with a notable peak at approximately 20" up range from the plate. The clutter appears to be independent of plate angle indicating a direct clutter source rather than a target/background interaction term. Both plots show the distinctive pattern produced by the edge scattering from the plate as it rotates. The weaker scattering from the leading edge (relative to the illumination direction) is consistent with horizontal polarization scattering. Both plots also show the nulls in the trailing edge scatter as the plate comes into alignment with either the transmit antenna or the receive antenna separated by 20°. However, the embodiment of the invention utilizing the string support system measurement has none of the nulling in the leading edge return caused by the bistatic clutter in the bistatic arm measurement, explaining why the lobing structure around plate edge-on illumination angles is missing in the corresponding global RCS plot (FIG. 5). The two point interference between the leading and trailing edges is destroyed.

The results illustrate that embodiments of the invention utilizing the string antenna support system are a significantly less interfering alternative to conventional mechanical towers. The inverted Stewart platform design used in some embodiments of the invention also gives equal mechanical stability with six degrees of freedom for antenna orientation While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A bistatic radar measurement system comprising:
   a radar source configured to produce a radio frequency signal;
   a transmitting antenna configured to transmit the radio frequency signal toward a target;
   a receiving antenna configured to receive a reflected radio frequency signal from the target; and
   a support system for supporting the receiving antenna having a plurality of dielectric strings, the support system configured to spatially orient the receiving antenna with respect to the target and the transmitting antenna.

2. The bistatic radar measurement system of claim 1, further comprising:
   an RF optical modem in electrical communication with the receiving antenna, the RF optical modem configured to amplify and convert the received reflected radio frequency signal to an optical signal;

a low radar cross section scattering fiber optic cable in communication with the RF optical modem and the radar source, wherein the optical signal is transmitted from the RF optical modem to the radar source through the fiber optic cable.

3. The bistatic radar measurement system of claim 1, wherein the support system comprises:

a rail;

a plurality of carts each configured to move along the rail; and a plurality of string motors coupled with each of the plurality of carts, the string motors configured to adjust the plurality of dielectric strings.

4. The bistatic radar measurement system of claim 3, wherein the plurality of carts is configured to move in tandem along the rail.

5. The bistatic radar measurement system of claim 4, wherein the string motors adjust the translational movement of the dielectric strings in concert with the movement of the carts along the rail.

6. The bistatic radar measurement system of claim 5, further comprising:

a feedback control system; and at least one infrared camera array in electrical communication with the feedback control system, wherein the feedback control system is configured to orient the receive antenna via the carts and string motors.

7. The bistatic radar measurement system of claim 1, wherein the support system is a Stewart Platform design.

8. The bistatic radar measurement system of claim 1, wherein the radio frequency signal from the radar source is a pulsed signal.

* * * * *